United States Patent
Balota

(10) Patent No.: US 6,637,126 B2
(45) Date of Patent: Oct. 28, 2003

(54) TAPE MEASURE END HOOK FOR ELIMINATING ERROR IN PLANE SURFACES MEASURING

(76) Inventor: Adrian Balota, 6801 Wolflin #332, Amarillo, TX (US) 79106

( * ) Notice: Subject to any disclaimer, the term of this patent is extended or adjusted under 35 U.S.C. 154(b) by 0 days.

(21) Appl. No.: 10/050,327

(22) Filed: Jan. 18, 2002

(65) Prior Publication Data

US 2003/0136017 A1 Jul. 24, 2003

(51) Int. Cl.[7] .................................................. G01B 3/10
(52) U.S. Cl. .................................................. 33/770; 33/758
(58) Field of Search .................... 33/758, 755, 757, 33/768, 770, 771, 759, 760

(56) References Cited

U.S. PATENT DOCUMENTS

| | | | | | |
|---|---|---|---|---|---|
| 721,411 | A | * | 2/1903 | Alexander | 403/279 |
| 841,272 | A | * | 1/1907 | Read | 33/758 |
| 1,006,056 | A | * | 10/1911 | Bowers | 33/770 |
| 1,303,756 | A | * | 5/1919 | Ballou | 33/758 |
| 2,663,941 | A | * | 12/1953 | Dart | 33/768 |
| 3,745,663 | A | * | 7/1973 | Dodge | 33/759 |
| 3,913,233 | A | * | 10/1975 | Marcell | 33/770 |
| 4,924,597 | A | * | 5/1990 | Tursi | 33/758 |
| 4,930,227 | A | * | 6/1990 | Ketchpel | 33/755 |
| 5,231,769 | A | * | 8/1993 | Mahan | 33/770 |
| 5,600,894 | A | * | 2/1997 | Blackman et al. | 33/758 |
| 5,937,532 | A | * | 8/1999 | Eirich et al. | 33/758 |
| 6,032,379 | A | * | 3/2000 | Usami | 33/758 |
| 6,052,914 | A | * | 4/2000 | Soon | 33/758 |
| 6,115,931 | A | * | 9/2000 | Arcand | 33/668 |
| 6,212,787 | B1 | * | 4/2001 | Dixon | 33/759 |
| 6,226,886 | B1 | * | 5/2001 | Lamond | 33/769 |
| 6,370,790 | B1 | * | 4/2002 | Stenger | 33/758 |
| 6,442,863 | B1 | * | 9/2002 | Poineau et al. | 33/758 |
| 2002/0029489 | A1 | * | 3/2002 | Murray | 33/755 |

\* cited by examiner

Primary Examiner—Christopher W. Fulton
Assistant Examiner—Amy R. Cohen

(57) ABSTRACT

Tape measure end hook for eliminating error in plane surfaces measuring. The tape measure end hook consists of a slidable hook composed by two pieces attached by rivets to the end of the metallic tape measure for more accurate when measuring the dimension placed in/on plane surfaces. The metallic tape has the apertures for rivets shaped that the strained end of the rivets not exceed the bottom/lower surface of the tape for eliminating snagging on a work piece.

3 Claims, 3 Drawing Sheets

TAPE MEASURE END HOOK FOR ELIMINATING ERROR IN PLANE SURFACES MEASURING

TITLE OF INVENTION

Tape measure end hook for eliminating error in plane surfaces measuring.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION a. Field of the Invention

The present invention relates to a tape measure having an (improvement of the) end hook device, eliminating therefore a measuring error.

b. Description of the Prior Art

The tape measure became an important tool for all measurements even is used in industry, building or at home. There is a large variety of tape measure produced by many manufactories worldwide. A usual tape measure has a hook at the end of the tape to hook onto the object being measured. Many of them for example U.S. Pat. No. 6,212,787 to Dixon have it proof system to eliminate error for both interior and exterior measurements, the hook sliding along the longitudinal axis of the tape rule w ith a distance equals with the thickness of the flange, which is not the object of the present invention. Another example is U.S. Pat No. 4,924,597 to Tursi having a wide variety of different items that can be attached to the tape measure no one solving the error that the present invention does. Frequently is measured for example steel sheet to trace contour for cutting or machining and the base of measurement does not begin from the edge to hook the tape on it. When the tape rule is used to measure in plane surfaces the measurement become uncomfortable because of the classical hook, which is bended at 90 degree and cannot be seated (placed) on the object. The "0" division of the tape rule will never be on tile place tile measurement have to starts. Any time when measure in plane surfaces an error that is not negligible appears as is shown in FIG. 4.

There are inventions that solve just partially the problems. Exists tape rules having at the end a ring to hang it on a fixed point (screw, nail, etc) but cannot be hanged to an edge. Another inconvenient of the tape measure in the prior art is that when measuring parts having sharp edges the end of the tape measure can hangs to rivets. Particularly if the work piece is long will be hard for the operator to observe the end of the tape is placed correctly or on rivets. The invention of Ten Soon—U.S. Pat No. 6,052,914—has solution for eliminating snagging on a work piece having

BRIEF SUMMARY OF THE INVENTION

The advantages of the present invention are:

eliminates an error when measuring in plane surfaces.

eliminates snagging of the rivets on the work piece.

a new concept and shape of the hook simple and inexpensive to manufacture.

more easy to handle

These advantages can be understood by the following detailed description and drawing.

LIST OF NUMERALS UTILIZED IN THE DRAWING

Figure 1:
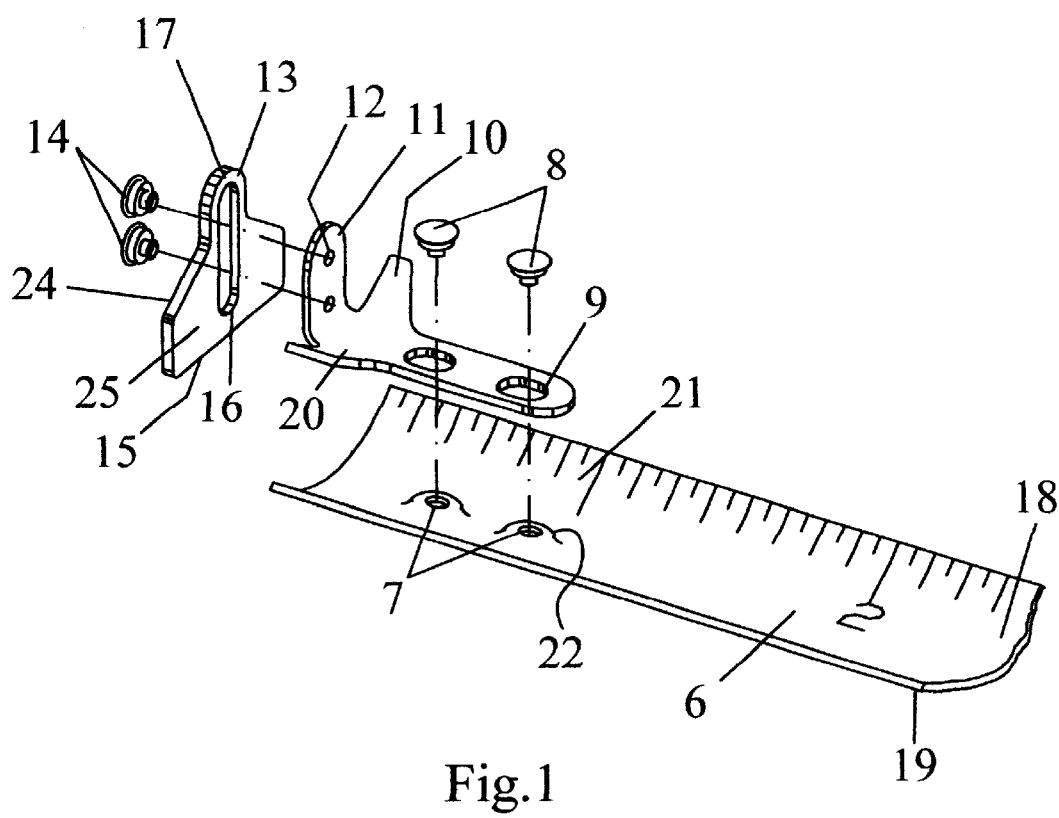
FIG. 1 is an exploded view of the invention.
Figure 2:
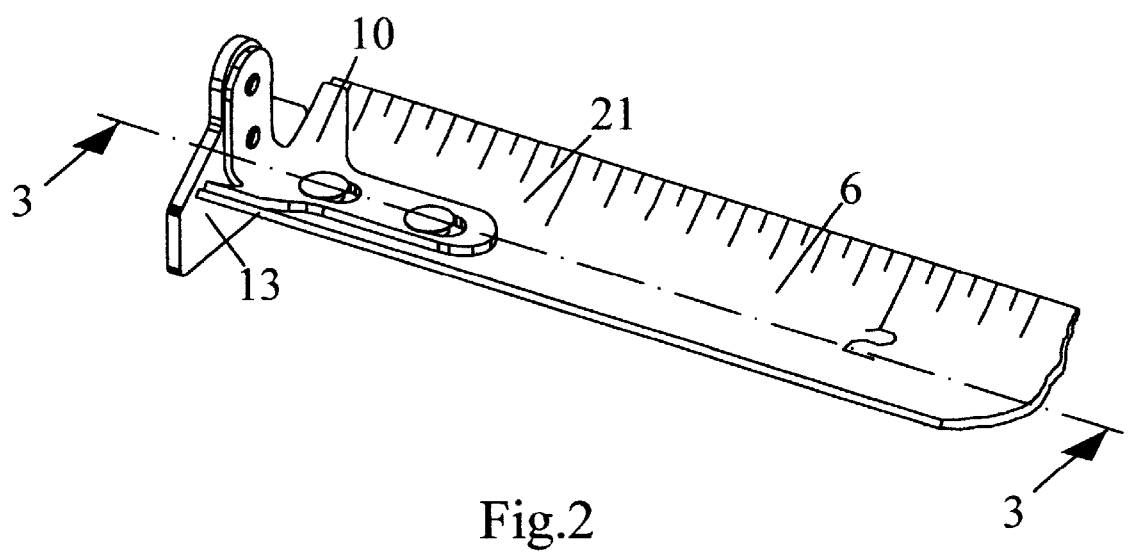
FIG. 2 is a perspective view of the tape measure.

6—tape rule
7—aperture file end 21 of the tape rude 6
8—rivets
9—through elongated bores in the bended piece 10
10—bended piece
11—vertical portion of the bended piece 10
12—through bores of the vertical portion 11 of the bended piece 10
13—sliding piece
14—rivets for sliding piece 13
15—bottom of the sliding piece 13
16—aperture of the sliding piece 13
17—top of the sliding piece 13
18—tipper surface of the tape rule 6
19—lower surface of the tape rule 6
20—base side of the bended piece 10
21—free end of the tape rule 6
22—special shaped around the bores 7 of the free end 21 of the tape rule 6
23—groove of the sliding piece 13
24—outer part (Surface) of the sliding piece 13
25—inner part (surface) of the sliding piece 13

DETAILED DESCRIPTION OF THE INVENTION

Figure 3:
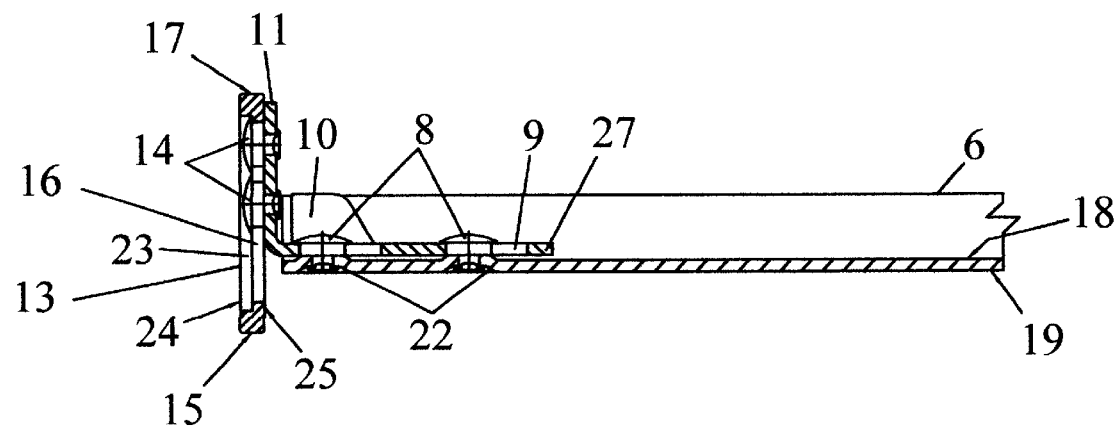
FIG. 3 is sectional view taken of the longitudinal axis of the tape measure.
Figure 4:
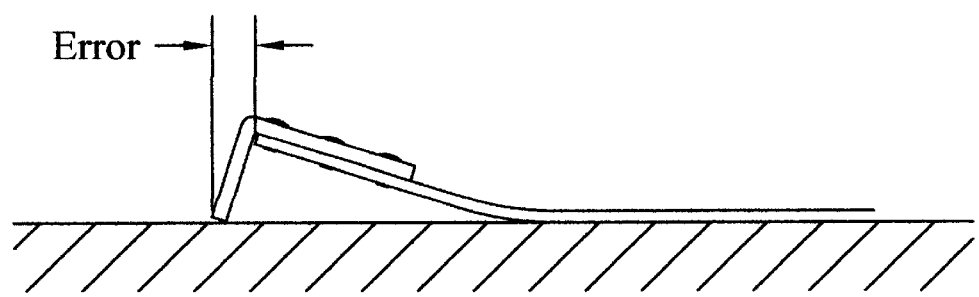
FIG. 4 is a view to show the error of a classic tape measure end hook.

The present invention is generally presented at FIG. 1 in an exploded view and it comprises a tape rule 6 with an upper surface 18 and a lower surface 19, having at the free end 21 at least two apertures 7. The bended piece 10 has a base side 20, having at least two elongated through bores 9 on its longitudinal axis and a vertical portion 11, bended at 90 degrees having two through bores 12 on its vertical axis. The bended piece 10 that is longitudinally slidable is placed on the free end 21 of the tape rules 6 and is affixed on it by at least two rivets 8 having strained ends through the elongated bores 9 from the bended piece and through the apertures 7 from the free end 21 of the tape 6. As easily can be seen in FIG. 3, the apertures 7 from the free end 21 of the tape rule 6 are so kind shaped 22 that the strained ends of the rivets 8 not exceed the lower surface 19 of the tape rule 6, being a proof way to prevent snagging on the working piece. The sliding piece 13, which is vertical, has a bottom 15, a top 17 and is perpendicular positioned with the inner part 25, to the free end 21 of the tape rule 6. The sliding piece is affixed to the bended piece 10 by a system that allows its sliding. In the figures shown is presented an example of a system compound by two rivets 14 mounted on the bended piece 10 through the aperture 16 from the sliding piece 13. The heads of the rivets 14 slides in a groove 23 made around the aperture 16 of the sliding piece 13, such a way that the top of the rivets not exceeding tile outer part (surface) 24 of the sliding piece 13 to eliminate error for interior measurements.

Figure 5:
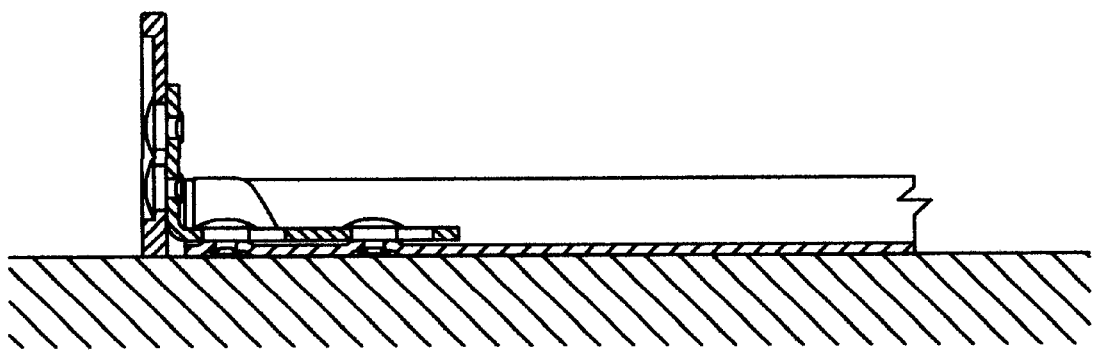
FIG. 5 is a view to show how the new tape measure eliminates the error.
Figure 6:
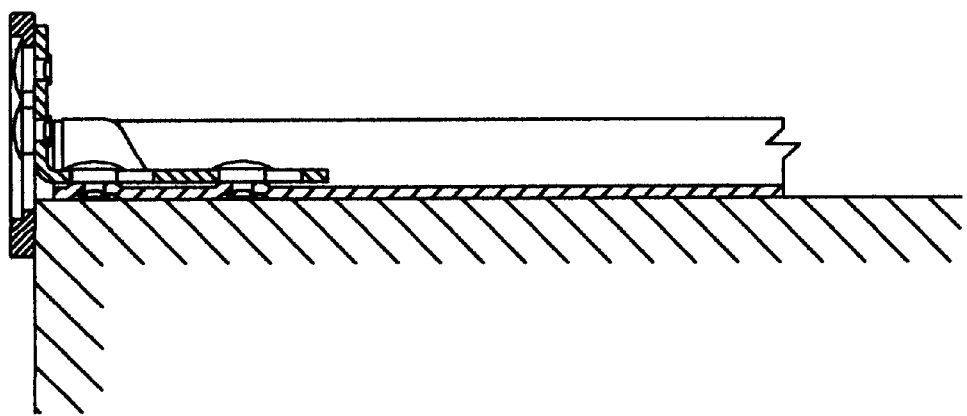
FIG. 6 is a view to show how to use the invention to hook it to the working piece.

The main parts, bended piece 10 and sliding piece 13 affixed to the free end of the tape rule, compound the hook of the tape rule. For measurement in plane surfaces the bottom 15 of the sliding piece 13 has to be pushed up till stops that the sliding piece 13 and the lower surface 19 of the tape rule 6 will be in the same plane as is shown in FIG. 5. For measurement starting from an edge or border the sliding piece 13 has to be pushed down to can hook the end of the tape (FIG. 6).

What is claimed is:

1. A tape rule provided with an end hook for eliminating error in plane surfaces measuring comprising:

A) a tape rule with an upper surface and a lower surface having a free end, a bended piece at a right angle having a base side fastened to the said upper surface of the said tape rule and a vertical portion, the said bended piece being entirely positioned on the said upper surface of the said tape rule;

B) a sliding piece having a bottom part, the said sliding piece being attached to the said vertical portion of the said bended piece in such a way that the said sliding piece can slide along a vertical axis of the said vertical portion of the said bended piece, the said bottom part and the said upper surface of the said tape rule being at the same level at the extreme upper course of the said sliding piece; and C) the end hook for eliminating for eliminating error also for eliminating snagging on a work piece fastened by rivets to the said free end of the said tape rule having a system to eliminate error for both interior and exterior measurements and apertures for rivets which have strained ends, the said apertures for rivets shaped that the said strained ends of the rivets not exceed the said lower surface of the said tape rule.

2. A tape rule provided with an end hook for eliminating error in plane surfaces measuring according to claim 1, wherein the said sliding piece also comprises a top, an inner surface, an outer surface and an aperture, affixed to the said vertical part of the said bended piece by at least two rivets mounted on the said bended piece through the said aperture of the said sliding piece, the heads of the rivets sliding in a groove made around the said aperture of the said sliding piece to allow its vertical movement in such a way that the top of the rivets do not exceed the said outer surface of the said sliding piece.

3. A tape rule provided with an end hook for eliminating error in plane surfaces measuring as in claims 1 or 2 having a proof system to eliminate error for both interior and exterior measurements.

* * * * *